Jan. 30, 1945. B. M. BODDE 2,368,099
TRANSLUCENT SCREEN
Original Filed Nov. 2, 1942
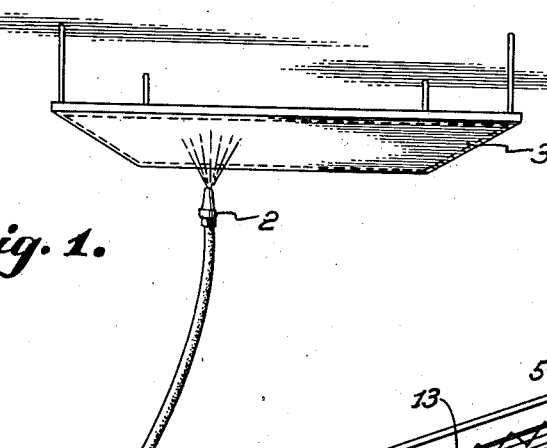
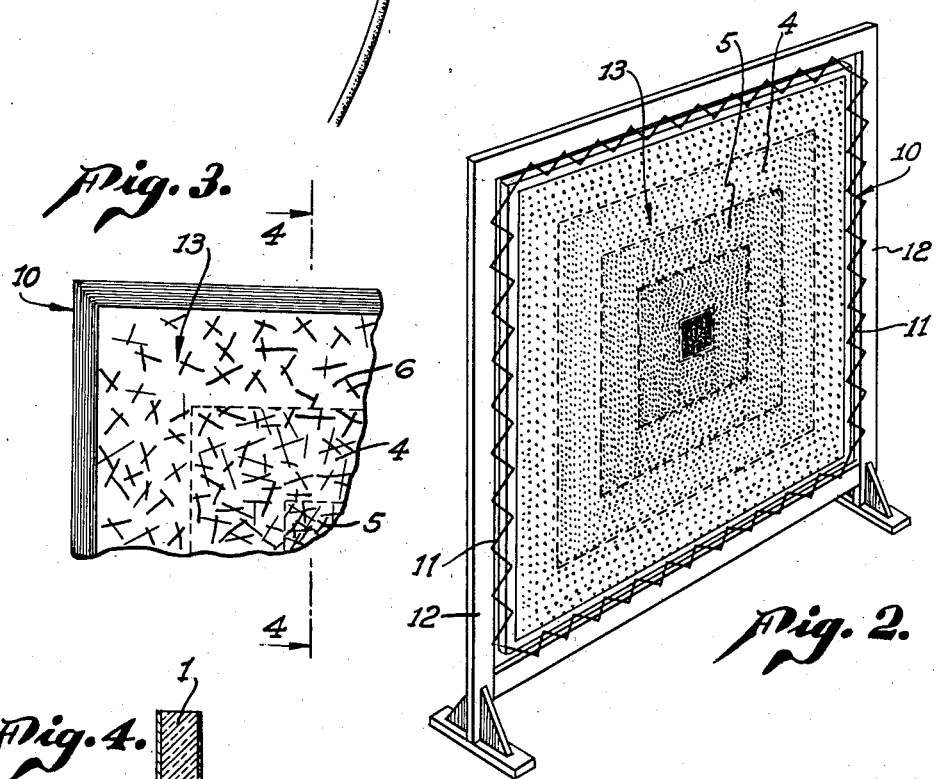
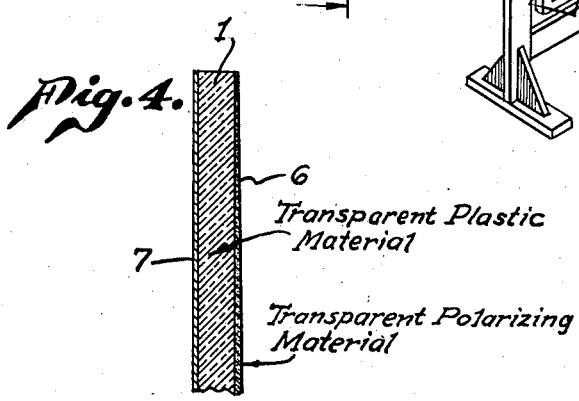
BERNARD M. BODDE,
INVENTOR.
BY W. E. Britt
ATTORNEY Patented Jan. 30, 1945

2,368,099

UNITED STATES PATENT OFFICE 2,368,099

TRANSLUCENT SCREEN

Bernard M. Bodde, Los Angeles, Calif.

Original application November 2, 1942, Serial No. 464,263. Divided and this application August 2, 1943, Serial No. 497,033

1 Claim. (Cl. 88—28.93)

The invention relates to the translucent type of screen suitable for the projection of still or motion pictures on one side thereof, for viewing or photographing on the opposite side.

A common difficulty encountered in the projection of pictures upon a translucent screen is, unless special precautions are taken, the picture has a "hot spot" due to a higher value of light intensity at the center of the screen than at the edges.

Heretofore, this "hot spot" problem has been approached from the standpoint of bending the unwanted amount of light rays away from the screen abaxially of the projection axis. According to the present invention, I approach this problem from an entirely different standpoint and stop the unwanted rays at the screen, while nevertheless using transparent material therefor. Preferably this stopping of the unwanted light rays at the screen is graduated along the screen in a manner to overcome the "hot spot." By stopping the desired amount of the light rays at the screen, I obtain a sharp picture on the projection side of the screen, and a picture which has the appearance of substantial depth.

For further details of the invention reference may be made to the drawing wherein Fig. 1 illustrates diagrammatically a matrix and spray which may be employed for making both the base of the screen, and applying the coating of this invention thereon.

Fig. 2 is a perspective view of a screen according to the present invention, the coating thereon having random polarization due to microscopic crystalline material, the density thereof increasing towards the center of the screen.

Fig. 3 is an enlarged plan view with parts broken away of a corner of the screen of Fig. 2.

Fig. 4 is a sectional view on line 4—4 of Fig. 3.

As explained in my former patents, I prepare a translucent picture projection screen 10 having a flexible transparent base 1 of plastic material such as cellulose acetate, ethyl cellulose, or other plastic. The transparent sheet 1 may be formed by spraying a solution thereof in a suitable solvent, by means of the spray 2 on the underside of a horizontal matrix 3. Multiple coats are applied, until the base 1 is, for example, .015 inch thick, or at least thick enough to withstand stretching flat, without thereby stretching the coating 6 on this base, for reasons which will be explained. For small screens, the base 1 may be prepared by shaving a block of the plastic material. While I prefer to make the base 1 by spraying on the underside of the matrix 3, this matrix may be arranged in any other suitable position, if desired. Regardless of the manner in which the base 1 is obtained, I arrange it to receive the coating of this invention, and for this purpose if the base 1 is made by spraying on the matrix 3, it may be left on this matrix and the coating sprayed thereon, or it may be stripped from matrix 3, or a shaved sheet may be taken and arranged in any suitable position to receive the coating.

To prepare the coating of this invention, preferably I take a solution of plastic material, viz. the same material used to make the base 1 and mix therewith a solution of material adapted to crystallize to form microscopic crystals adapted to polarize light, and apply the resulting coating to the base 1 without stretching the base 1 either while the coating is drying, or thereafter, whereby a random orientation of the microscopic crystals is obtained when the crystals form in situ on the base 1. This results in random polarization of light passing through the screen. Preferably I prepare this polarizing solution in approximately the following manner and proportions. To six grams of quinine bisulphate, or other members of the quinine family, add 200 cc. of butyl alcohol, heat and stir to dissolve the quinine until it becomes viscous or thick like molasses. While it is hot, add thereto about an equal quantity of approximately two grams of iodine sulphate dissolved in 40 cc. of ethyl alcohol, mix and allow to cool and the mass will become of the consistency of gelatine. The iodine delays the crystallization of the quinine. Then take 1% or 2% of the gelatine-like mix and add to 99% or 98% of the screen material such as ethyl cellulose, or cellulose acetate dissolved in a solvent, mix thoroughly and spray this coating material with a spray such as 2, onto the base 1. Preferably the coating material which is described is first uniformly sprayed on the base 1, very thin, for example to a thickness of .0001 inch. Then beginning at a place inside the margin of the screen as indicated at the rectangle 4, spray another thin coating and then beginning at a greater distance from the margin as indicated by the rectangle 5 spray another coating, etc. to gradually increase the thickness of the coating 6 as the center of the screen is approached. The thickness of the coating 6 at the center of the screen may be of the order of five times as thick as it is at the edges, namely .0005 inch.

As the polarized coating material is largely composed of the same material as the base 1, this coating 6 integrally unites with the screen to form a coating which is flexible like the base 1, and this coating is transparent.

On examining the coating thus produced, under a microscope with magnification of about 700, the quinine crystals look like telephone poles, and their arrangement is entirely random, that is, like a jumbled mass of telephone poles indicated at 13 in Fig. 3, with the thickness of the pile of telephone poles or microscopic crystals, increasing towards the center of the screen as shown. However, the proportions above indicated are such that the crystals are separated so that light can pass between them without being polarized, such interstices decreasing in size as the thickness of the crystal pile increases towards the center of the screen. However, the light that strikes a crystal at the bottom of the pile is polarized in one direction and such light, on striking a crystal above it which lies at an angle thereto, can pass through the upper crystal in an amount depending upon the angle between the two crystals. If they are at right angles to each other, no light will pass where the upper crystal intersects the light from the lower crystal. The areas in which the light is transmitted through the coating are very small in comparison to the size of the magnified silver grain of the picture as it appears on the screen and hence whatever appearance of grain may be in the projected picture is not increased by reason of the use of this coating.

If the base 1 were not employed and if the coating 6 were stretched in one direction either while it is drying, or after it has dried, this would have a tendency to orient all of the crystals in one direction whereby the coating as a whole would polarize all of the light reaching it, in one direction. While this feature may be useful in other situations, I take pains to avoid it, and hence allow the coating 6 to dry and crystallize on the base 1 without stretching it and also employ a base 1 which is many times thicker than the coating and thick enough to permit the screen to be stretched flat without stretching the coating.

A screen made according to the present invention has been constructed and tested and it has been found that it stops the unwanted quantity of light at the screen and the picture projected on the screen has the appearance of substantial depth. Also the image of the projected picture is formed on the screen 10 even though its base 1 and coating 6 are both transparent.

If desired, a small quantity of suitable thinner or solvent may be employed to cut the gloss and resulting glare on the backside 7 of the screen.

The screen 10 as disclosed in my above patents, may be mounted by means of a flexible cord 11 in a suitable framework 12, or any other suitable mounting may be employed.

This application is a division of S. N. 464,263 filed November 2, 1942, for Translucent screen manufacture.

Various other modifications may be made in the invention without departing from the spirit of the following claim.

I claim:

A translucent picture projection screen comprising a sheet of substantially transparent material, and a coating thereon of plastic material having embedded therein a random array of stacks of microscopic crystals adapted to polarize light, said crystals at the edge of said sheet being spaced far enough apart in a direction across said sheet to admit light through said sheet between said crystals, the interstices between said crystal stacks becoming smaller in size toward the center of the screen.

BERNARD M. BODDE.